Aug. 27, 1963 C. C. HONEY ETAL 3,102,246

NOISE REDUCING MEANS FOR TRANSFORMER

Filed Dec. 17, 1958 4 Sheets-Sheet 1

INVENTORS.
CHARLES C. HONEY
KENNETH C. STEWART
LAWRENCE R. TOOTHMAN

BY Lee H. Kaiser
Attorney

INVENTORS.
CHARLES C. HONEY
KENNETH C. STEWART
LAWRENCE R. TOOTHMAN
BY Lee H. Kaiser
Attorney

NOISE REDUCING MEANS FOR TRANSFORMER

Filed Dec. 17, 1958

4 Sheets-Sheet 3

INVENTORS.
CHARLES C. HONEY
KENNETH C. STEWART
LAWRENCE R. TOOTHMAN
BY
Lee H Kaiser
Attorney INVENTORS.
CHARLES C. HONEY
KENNETH C. STEWART
LAURENCE R. TOOTHMAN
BY Lee H Kaiser
Attorney 3,102,246
NOISE REDUCING MEANS FOR TRANSFORMER
Charles C. Honey, Bridgeville, Lawrence R. Toothman, Houston, and Kenneth C. Stewart, Bridgeville, Pa., assignors to McGraw-Edison Company, Milwaukee, Wis., a corporation of Delaware
Filed Dec. 17, 1958, Ser. No. 781,163
17 Claims. (Cl. 336—100)

This invention relates to means for controlling and reducing the audible noise emanating from stationary electrical induction apparatus such as electrical transformers.

The problem of audible noise produced by transformers has become of increasing importance as a result of the trend to locate power substations near residential areas. The phenomenon of magnetostriction relating to cyclic expansion and contraction of the magnetic core steel attending magnetization is the principal source of vibratory forces and sound wave energy in the transformer. The 60 cycle alternating current commonly used in connection with transformers causes the core laminations to change their dimensions 120 times per second and generate an undesirable vibratory hum. In prior art transformers the vibrations of the magnetic structure were often amplified by magnetic or mechanical excitation of other parts of the transformer. Further, the sound wave energy and vibratory forces propagated by the core of prior art transformers were often transmitted to the exterior of the tank through the metallic members which connected the transformer core to the enclosing tank.

Transformer manufacturers have been continually confronted with requests from electrical utilities for ever-increasing kva. ratings while holding the physical size of the transformer to a minimum, and this has resulted in increased magnetic flux density in magnetic cores with consequent increase in radiated noise. Efforts to reduce noise by metallurgical advances in magnetic steel have met with some success. Further, investigations into minimizing resonance in transformer tank walls by use of damped panels and non-resonant shapes to reduce vibrations at the frequency of vibration of the driving source have also resulted in reduction of radiated sound. When suitably low noise levels cannot be achieved by such techniques, resort is sometimes had to a double tank construction which employs the principles of transmission loss and sound absorption. However, such double wall construction tends to be expensive and cumbersome and to introduce the additional problem of heat dissipation.

When the transformer core and coil assembly is immersed in an insulating dielectric liquid such as transformer oil, the dielectric liquid transmits both the sound wave energy and the vibratory forces to the walls of the transformer casing. Since oil is nearly incompressible, the vibrations emanating from the core are strongly coupled to the walls of the transformer tank. As a consequence the tank walls are forced into vibration and radiate airborne sound energy into the surrounding area. In addition, sound pressure waves originating at the magnetic core are transmitted through the oil and thence through the tank walls into the surrounding atmosphere.

In accordance with the invention, reduction in radiated noise is accomplished by shunting the vibratory forces transmitted through the oil which tend to drive the tank walls.

It is a primary object of the invention to provide means for reducing the audible sound energy radiated from the transformer tank walls resulting from coupling of vibratory forces by the liquid dielectric to the tank walls.

It is a further object of the invention to provide a transformer having means within the liquid dielectric for changing the compressibility of the liquid dielectric and thus reducing the sound energy radiated by the tank walls.

Another object of the invention is to provide a transformer having within the liquid dielectric means including at least one element comprised of compliance and mass for shunting the vibratory forces transmitted through the dielectric liquid and tending to excite the transformer tank walls.

It is a still further object of the invention to provide a transformer having within the liquid dielectric at least one element comprised of compliance and mass tuned for resonance at a frequency of the driving source and providing a shunting network for the vibratory forces which would otherwise be applied to the tank walls.

Another object of the invention is to provide compliant means in the liquid dielectric between the transformer core and the tank walls for simultaneously changing the compressibility of the liquid dielectric and for absorbing a portion of the vibratory and sound wave energy.

These and other objects and advantages of the invention will be better understood from the following detailed description when taken in conjunction with the accompanying drawing wherein.

Figure 2:
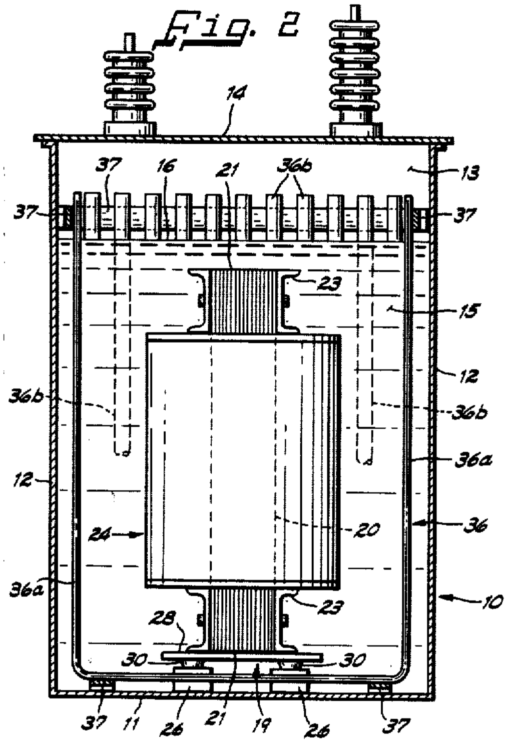
FIG. 2 is a vertical section view taken on lines 2—2 of FIG. 1.
Figure 1:
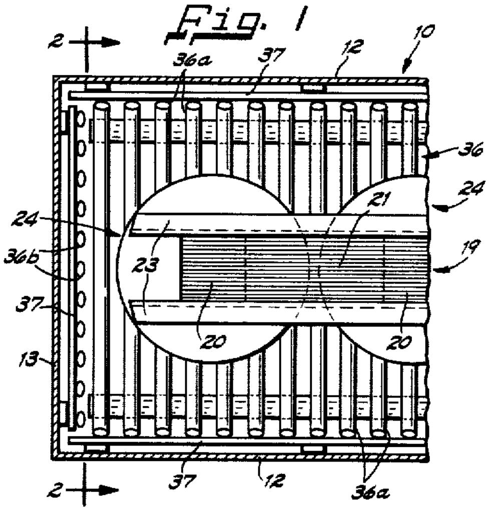
FIG. 1 is a partial horizontal sectional view through an electrical transformer embodying the invention.
Figure 4:
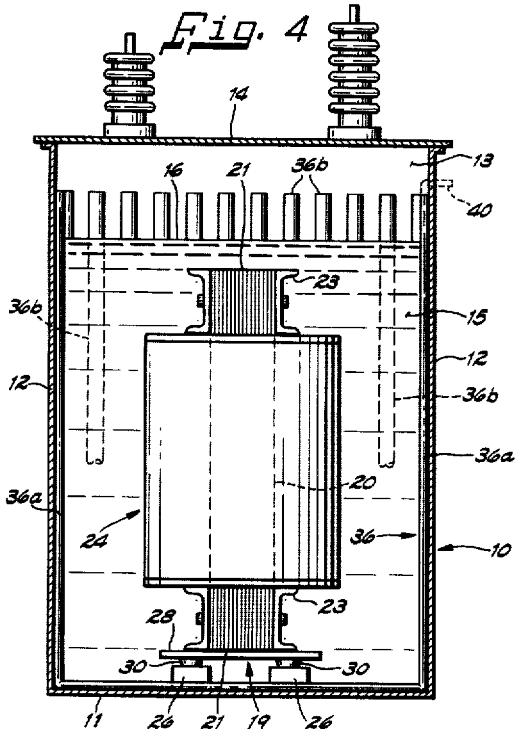
FIG. 4 is a vertical sectional view taken on lines 4—4 of FIG. 3.
Figure 3:
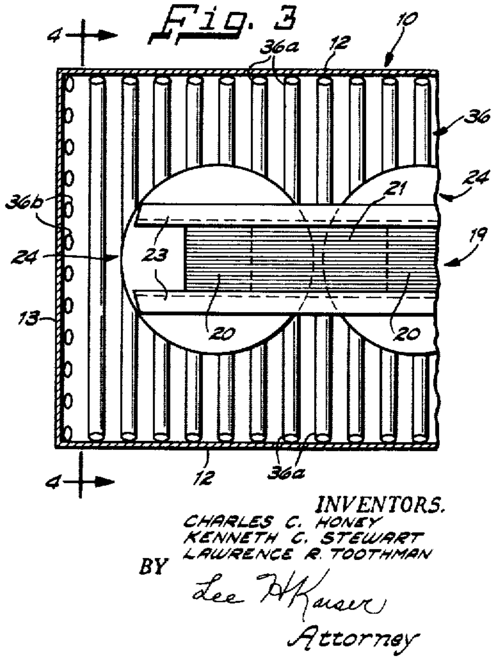
FIG. 3 is a partial horizontal view through an electrical transformer incorporating an alternative embodiment of the invention.
Figure 10A:
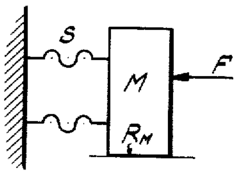
Figure 10B:
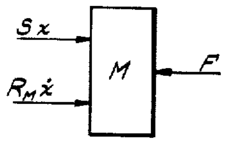
Figure 10C:
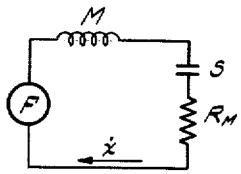
Figure 14:
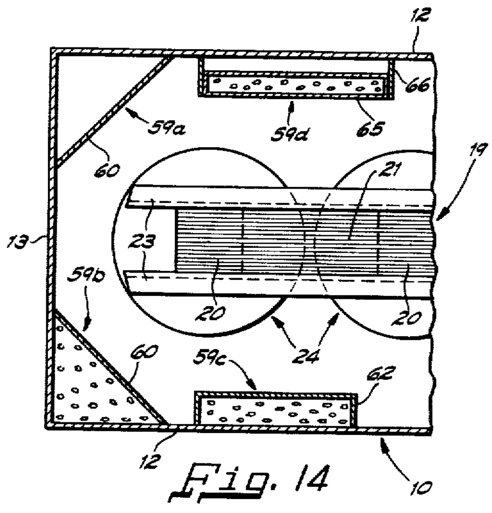
Figure 13:
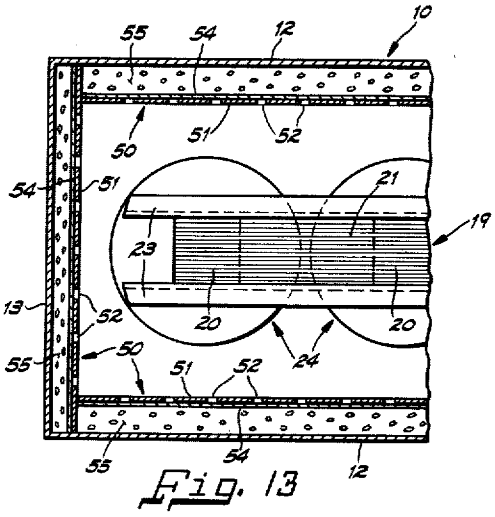
Figure 11A:
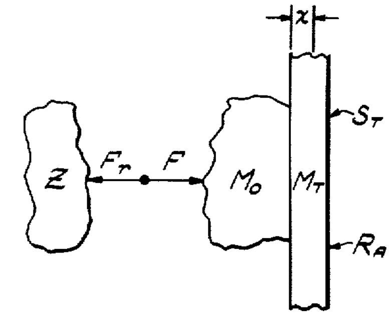
Figure 11C:
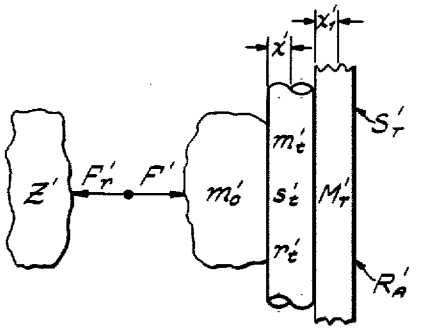
Figure 11B:
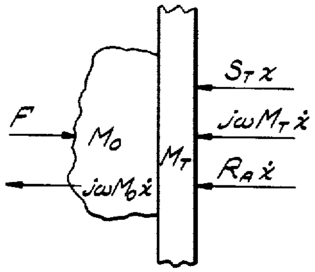
Figure 11D:
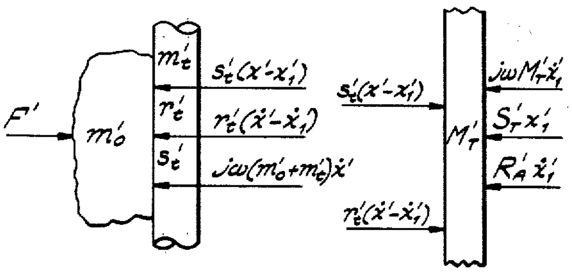
Figure 11E:
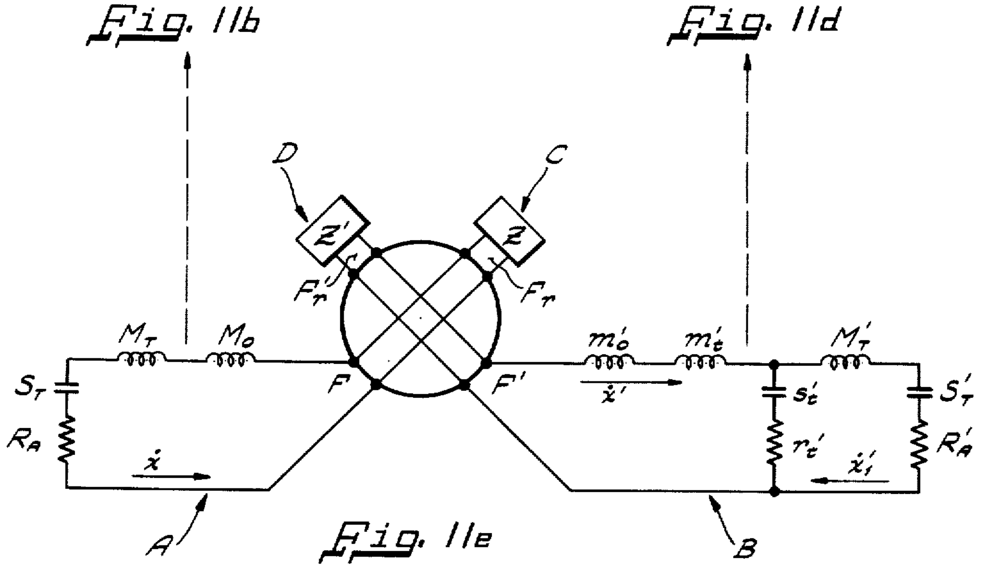
Figures 12A, 12B, 12C, 12D, 12E, 12F, 12G:
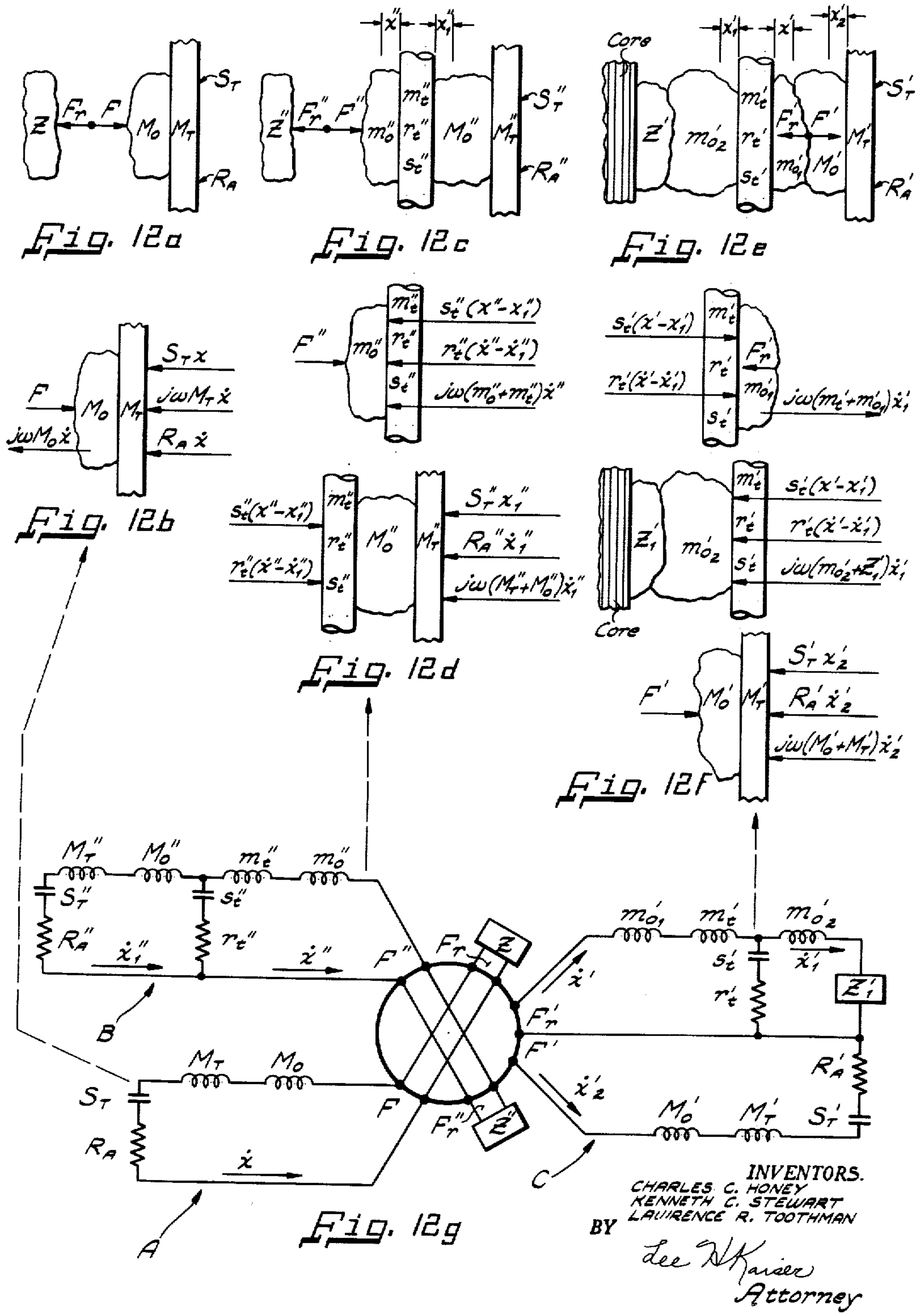

FIGS. 6, 7, 8, and 9 are enlarged fragmentary views of four of the many possible types of compliant elements which can be utilized to shunt the vibratory forces transmitted by the transformer oil and tending to excite the tank walls;

FIG. 10*a* illustrates the components of, and forces acting in, a simple lumped-parameter mechanical system; FIG. 10*b* is the free body diagram associated with FIG. 10*a*; and FIG. 10*c* is an analogous equivalent electrical circuit representing the mechanical system of FIG. 10*a*;

FIG. 11*a* illustrates the lumped-parameter mechanical system of the embodiment of FIGS. 3 and 4 with the force applied directly against the tank wall; FIG. 11*b* is the free body diagram associated with FIG. 11*a*; FIG. 11*c* is similar to FIG. 11*a* but with the force applied between the magnetic core and a compliant element; FIG. 11*d* is the free body diagram associated with FIG. 11*c*; and FIG. 11*e* illustrates the analogous electrical circuits of the systems of FIGS. 11*a* and 11*c*;

FIG. 12*a* illustrates the lumped-parameter mechanical system of the embodiment of FIGS. 1 and 2 with the force applied directly against the tank wall; FIG. 12*b* is the free body diagram associated with FIG. 12*a*; FIG. 12*c* is similar to FIG. 12*a* but with the force applied between the magnetic core and a compliant element; FIG. 12*d* is the free body diagram associated with FIG. 12*c*; FIG. 12*e* is similar to FIGS. 12*a* and 12*c* but with the force acting between the compliant element and the tank wall; FIG. 12*f* is the free body diagram associated with FIG. 12*e*; and FIG. 12*g* illustrates the analogous electrical circuits for the systems of FIGS. 12*a*, 12*c*, and 12*e*; and, FIGS. 13 and 14 are partial horizontal views through transformers incorporating still other embodiments of the invention.

The forces transmitted through the transformer oil which excite the tank wall can best be determined by analyzing the mechanical system of the transformer using electric circuit analogy. It is well known that the dynamics of mechanical systems whose elements are concentrated or "lumped" in space can be conveniently analyzed by representing the mechanical system in electrical circuit form. That is, by drawing a schematic circuit diagram of a linear mechanical oscillating system having one or more degrees of freedom, its analysis can be simplified and its similarity to other problems more easily recognized. If the elastic displacements of the medium are small enough to satisfy Hooke's law, equations using only linear restoring forces can be derived. The components of a linear mechanical system are of three kinds: (1) Mass M is an element which possesses inertia and is that physical property which when acted upon by a force is accelerated in direct proportion to the force, (2) stiffness S is the property displayed by a massless spring and is the force required to produce a unit deflection, and (3) mechanical resistance, or viscous friction, $R_m$, which has the dimensions of force/velocity and is the property displayed by a massless plunger moving in a vessel of liquid. This mechanical resistance to motion that the fluid surrounding an oscillating body manifests arises from the radiation of sound waves and from the presence of fluid forces of viscosity; it depends on the velocity of the body and can be expressed mathematically as $$F=R_m\frac{dx}{dt}=R_m\dot{x}$$

where $R_m$ is called the mechanical resistance, $x$ is the instantaneous displacement, and $\dot{x}$ is instantaneous velocity which is the vector derivative of displacement with respect to time. The equation for motion of a simple oscillator constrained by a stiffness force $-Sx$ becomes $$m\frac{d^2x}{dt^2}+R_m\frac{dx}{dt}+Sx=F$$

and $$m\ddot{x}+R_m\dot{x}+Sx=F$$

where $\ddot{x}$ is the vector derivative of velocity with respect to time, and it will be noted that the equation has the same form as that for the free oscillation of charge in a series electrical cricuit containing inductance, resistance, and capacitance. Differential equations can thus be derived for such a linear mechanical oscillating system which are identical in form to the equations for series electrical circuits and for parallel electrical circuits, and it is possible to set up detailed analogies between electrical and mechanical systems. If the series electrical circuit is chosen as the analogous system, mass is analogous to inductance; compliance, which is the inverse of stiffness, is analogous to capacitance; mechanical resistance, or viscous friction, to electrical resistance; force to voltage; velocity to current; and displacement to electrical charge.

If $w$ represents $2\pi f$ and the instantaneous displacement $x=x_0e^{jwt}$, then $$\dot{x}=jwx_0e^{jwt}=jwx$$

and $$\ddot{x}=jwjwx_0e^{jwt}=jw\dot{x}$$

Inasmuch as inductance is analogous to mass M, the mechanical inertial reactance may be defined as $$X_m=wM=2\pi fW/g$$

Inasmuch as capacitance is analogous to compliance, the inverse of stiffness S, the mechanical stiffness reactance is defined as $$X_s=\frac{1}{2\pi f\left(\frac{1}{S}\right)}=\frac{S}{w}$$

As stated before, mechanical resistance is analogous to electrical resistance and is defined $$R_m=F/v=F/\dot{x}$$

The analogous mechanical impedance is then $$Zm=R_m+j(wM-S/w)$$

The technique to determine the equivalent electrical circuit of a mechanical oscillator utilizes the free body diagram of mechanics. Consider the mechanical system of FIG. 10*a* wherein a sinusoidal force F exerted against a mass M is opposed by the forces $-Sx$ and $-R_m\dot{x}$ where $x$ is the displacement of mass M, S is the stiffness constant of the spring, $R_m$ is the mechanical resistance to motion, and $\dot{x}$ is the velocity attained by the mass M. The free body diagram of the mass illustrated in FIG. 10*b* shows that the unbalanced force causes an acceleration $\ddot{x}$ $$F-Sx-R_m\dot{x}=M\ddot{x}$$

Converting displacement and acceleration to velocity $$F-S\frac{\dot{x}}{jw}-R_m\dot{x}=jwM\dot{x}$$

$$F=R_m\dot{x}+jwM\dot{x}+\frac{S\dot{x}}{jw}$$

$$F=\dot{x}\left[R_m+\left(jwM+\frac{S}{jw}\right)\right]$$

Noting that force F is analogous to voltage and velocity $\dot{x}$ is analogous to current, it follows that the analogous mechanical impedance $$Z_m=F/\dot{x}=R_m+\left(jwM+\frac{S}{jw}\right)$$

This equation indicates that a single current flows through the resistance $R_m$ and also through two impedances one of which is of the $+j$ type and the other is of the $-j$ type. Consequently, the mechanical configuration of FIG. 10*a* can be presented by the equivalent electrical series circuit of FIG. 10*c*.

The amount of dampening in any oscillating mechanical system depends on the relation between the mechanical resistance and the mechanical inertial reactance and is often specified by a "quality factor" Q, which is analogous to the $$\frac{wL}{R}$$

factor in electrical circuits, and is defined as $$Q=\frac{w_oM}{R_m}$$

Figure 5:
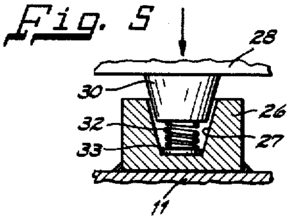
FIG. 5 is a detail view of means for resiliently supporting the core and coil assembly of the embodiments of FIGS. 1–4 and for mechanically decoupling the core from the transformer tank.

Several preferred embodiments of the invention will now be described and the analogous electrical circuit diagrams thereafter discussed. Referring to FIGS. 1 and 2, a metallic tank 10 having a bottom wall 11, vertical sidewalls 12, end walls 13, and a cover 14 is filled with a suitable insulating dielectric liquid 15 such as transformer oil to a level indicated by reference numeral 16. A transformer core and coil assembly immersed in the oil 15 includes a three-legged magnetic core 19 comprising a plurality of stacked laminations preferably of magnetic steel. The leg laminations 20 forming the legs of the core 19 are connected at their upper and lower ends by yoke laminations 21 forming upper and lower yoke portions of the core, and channel iron side frame members 23 are disposed on opposite sides of and bolted to the upper and lower yokes. Energization of the electrical windings 24 surrounding the core legs results in alternating magnetization of the core 19. The magnetic steel laminations 20 and 21 cyclically expand and contract due to the phenomenon of magnetostriction when magnetized and demagnetized by the current flowing in windings 24. The core 19 thus acts as a source of 120 cycle vibrations and harmonics thereof, and means are provided for resiliently supporting the core and coil assembly which afford maximum mechanical decoupling between the vibration propagating device 19 and the transformer casing 10. In the embodiment illustrated in FIGS. 1 and 2, cup members 26 secured by suitable means such as welding to the bottom plate 11 of the casing 10 are each formed to have a compartment 27 (see FIG. 5) of inverted frustoconical configuration. Transverse horizontal support members 28, preferably of structural iron, secured to the bottom surface of the lower side frame members 23 carry on the lower surface thereof depending lugs 30 of inverted frustoconical contour complementary to the shape of the compartment 27 in the cup members 26. Decoupling means illustrated as helical springs 32 resting on a disk 33 of suitable resilient material within the compartments 27 and compressed between the depending lugs 30 and the cup members 26 retain the lugs 30 out of direct contact with the cups 26 and transmit a minimum of vibratory forces to the transformer tank 10. The decoupling means may comprise springs only, resilient material only, or any suitable combination thereof, and jacking means from the top of the transformer compresses the compliant decoupling means rigidly against the cup members 26 during shipment of the transformer unit.

The transformer oil 15 also transmits the vibratory forces and the sound pressure waves originating in the magnetic core 19. Since the oil 15 is nearly incompressible, the oil strongly couples the vibrations of core 19 to the tank bottom 11, sidewalls 12, and endwalls 13 of tank 10, which are forced into vibration as panels and radiate audible sound. Further, sound pressure waves set up in the oil 15 are transmitted by the oil 15 to the walls of the tank 10 and through the walls of the tank 10 to the surrounding air.

In accordance with one feature of the invention both the vibratory forces and the sound pressure waves transmitted by the oil 15 from the core 19 to the tank walls are shunted by compliant means 36 interposed in the oil 15 between the core 19 and tank walls which means increase the effective compressibility, or reduce the stiffness, of the oil 15. In the embodiment illustrated in FIGS. 1 and 2, elongated compliant elements 36*a* of U-shape line the sidewalls 12 and bottom wall 11 and elongated compliant elements 36*b* line the end walls 13 of casing 10. As illustrated the compliant elements 36*a* and 36*b* are elongated, hollow, thin-walled tubes tied by fiber strands or otherwise suitably attached adjacent their ends to elongated horizontal support members 37 secured to the inner surfaces of the tank sidewalls 12 and end walls 13. Preferably both ends of the U-shaped compressible elements 36*a* are open and extend above the surface 16 of the oil 15 into the volume of gas within casing 10 above oil 15. Similarly, the upper end of the straight compliant elements 36*b* is open and extends into the gas space above the oil 15 while the lower end of the elements 36*b* is closed. In transformers having conservator oil preservation systems wherein the casing 10 is completely filled with oil 15, the upper ends of the compliant tubes 36*a* and 36*b* may extend through the casing walls and be in communication with the atmosphere or an external gas source as shown at 40 in FIG. 4. Consequently, the gas within compliant tubes 36*a* and 36*b* is at the same pressure as that as the gas above the oil 15, and if one compliant element 36*a* or 36*b* should develop a leak beneath the oil 15, only that compliant element 36*a* or 36*b* will fill with oil and the gas within the leaky tube will exhaust into the gas space within the casing 10 above the oil 15. Consequently, no bubbles occur in the oil 15 near the core and coil assembly where they might give rise to arcing. The compliant tubes 36*a* and 36*b* are disposed in spaced apart parallel relation in a plane array in the path of the incident vibratory forces originating in the magnetic core 19.

In the embodiment of FIGS. 3 and 4 the thin-walled, hollow, compliant tubes 36*a* and 36*b* are supported immediately adjacent the tank bottom wall 11, sidewalls 12, and endwalls 13 in planes in the path of the incident vibratory forces and sound pressure waves originating in the core 19.

Figure 6:
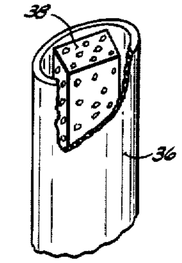
Figure 7:
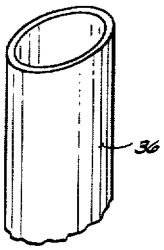

In certain embodiments of the invention the thin-walled, hollow, compliant tubes 36*a* and 36*b* are of a flexible, tough, oil-resistant material having high thermal resistance and a high dielectric constant, one suitable material being polyvinyl chloride filled with polyurethane foam. In other embodiments the compliant thin-walled tubes 36*a* and 36*b* are of a suitable metal such as aluminum or steel. As illustrated in FIGS. 6 and 7 the tubes 36 are preferably noncircular and of elliptical cross section, although the improved results of the invention can also be attained with compliant tubes 36 of circular cross section. As illustrated in FIG. 7 the compliant elements 36*a* and 36*b* may be filled with a suitable material 38 having a high sound absorption coefficient, one suitable material being light density fiber glass.

The vibratory forces and sound pressure waves transmitted by the oil are reduced by energy losses within the compliant elements 36 and the material 38 filling the compliant elements 36. Such energy losses in a wave propagated through a solid may be attributed to heat conduction, viscous friction, elastic hysteresis and scattering. The maximum force at any point within the oil 15 cannot exceed the inertial head of oil at that point, and the compliant elements 36, in effect, reduce such inertial head of oil.

Figure 9:
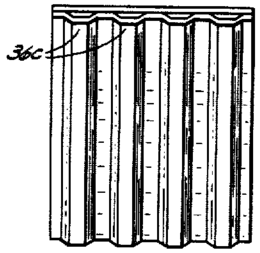

In the embodiment illustrated in FIG. 9 the compliant tubes 36*c* are formed as a sheet connoted "tube-in-strip" wherein two thin sheets secured together at predetermined point are expanded by hydraulic force to form parallel tubes. Tube-in-strip compliant elements 36*c* of both metal, such as aluminum, and plastic, such as polyvinyl chloride, are particularly effective in accomplishing the improved results of the invention.

As described in detail hereinafter, the stiffness constant $s_t$ and the mechanical resistance $r_m$ of the compliant elements 36 are selected to shunt a maximum of the vibratory forces and sound pressure waves originating in the magnetic core 19 and transmitted through the relatively incompressible oil 15 and exerted against the tank walls. In certain embodiments, and in particular the embodiments of FIGS. 1 and 2, the stiffness constant $s_t$ of the compliant elements 36 is selected so that the mechanical stiffness reactance and the mechanical inertial reactance due to the mass of the oil and the mass of the element are in series resonance at the frequency of the force generator so that the compliant elements 36 are tuned for resonance as discussed hereinafter. The mechanical resistance $r_m$ is held to a minimum in order to obtain a high quality factor Q.

The concept of a force generator beneath the oil 15 comprising the summation of the vector forces vectorially adding at a point to impart velocity to the transformer tank walls is helpful in analyzing the vibratory forces within the transformer. Many force generators which tend to impart velocity to the tank walls may exist within a given transformer. Consider that a force generator produces a force F′, illustrated in FIG. 11*c*, exerted against a small oil mass $m_o'$ associated with a small mass $m_t'$ of a compliant tube 36 mounted adjacent a small mass $M_T'$ of the tank wall of the embodiment of FIGS. 3 and 4. The force F′ transmitted through the oil mass $m_o'$ adjacent tube mass $m_t'$ results in displacement $x'$ of the tube mass $m_t'$ and also a displacement $x_1'$ of the tank wall mass $M_T'$. The free body diagram of FIG. 11*d* shows that the vibratory force F′ is reacted upon by (1) a force equal to the stiffness constant $s_t'$ of the tube multiplied by the difference in displacement $(x'-x_1')$ of the two sides thereof, (2) a force equal to the mechanical resistance $r_t'$ of the tube multiplied by the difference in velocities $(\dot{x}'-\dot{x}_1')$ of the two sides thereof, (3) a force equal to oil mass $m_o'$ plus tube mass $m_t'$ multiplied by the acceleration $\ddot{x}'$. From the free body diagrams it is possible to derive the equation.

$$F'-s_t'(x'-x_1')-r_t'(\dot{x}'-\dot{x}_1')-jw(m_o'+m_t')\dot{x}'=0$$

$R_A$ is the radiation acoustical impedance resulting from the air load on the tank wall and may be defined as the quotient of the sound pressure divided by the volume density of the air. Such radiation component of the mechanical impedance is a complex function of the area and shape of the radiating surface, its mode of vibration, and the intrinsic impedance of the meduim. The forces $s_t'(\dot{x}-x_1')$ and $r_t(\dot{x}-\dot{x}_1')$ exerted against the tank wall mass $M_T$ are opposed by (1) a force equal to that stiffness constant $S_T'$ of the tank wall multiplied by the displacement $x_1'$ thereof, (2) a force equal to the radiation impedance $R_A'$ of the tank wall multiplied by the velocity $\dot{x}_1'$, and (3) a force equal to the mass $M_T'$ multiplied by the acceleration $\ddot{x}_1'=jw\dot{x}_1'$ thereof. From the free body diagram of FIG. 11*d* it is possible to derive the second equation $$s_t'(x'-x_1')+r_t'(\dot{x}'-\dot{x}_1')-jwM_T'\dot{x}_1'-S_T'x_1'-R_A'\dot{x}_1'=0$$

The analogous electrical circuit diagram derived from these two equations is shown in branch B of FIG. 11*e*. It will be noted that the force F′ is 180 degrees out of phase with a reaction force $F_r'$ acting into the mechanical impedance Z′ of the electrical transformer at that point shown in branch D of FIG. 11*e*, and it will be obvious that before a force F′ can be applied to the tank wall, a force $F_r'$ of equal magnitude must be applied in the opposite direction.

Consider now the mechanical diagram of FIG. 11*a* illustrating that a force generator produces a vibratory force F exerted against a mass of oil $M_o$ associated with the small mass $M_T$ of the tank wall of the embodiment of FIGS. 3 and 4. $F_r$ is the reaction force resulting from the force generator acting at that point and Z is the mechanical impedance into which F operates. The force F results in a displacement $x$ of the tank wall mass $M_T$. The vibratory force F is reacted upon by the forces illustrated in the free body diagram of FIG. 11*b* from which it is possible to derive the equation $$F-S_Tx-jw(M_o+M_T)\dot{x}-R_A\dot{x}=0$$

The analogous electrical circuit diagram derived from this equation is shown in branch A of FIG. 11*e*. The reaction force $F_r$, which is 180 degrees out of phase with the vibratory force F, operates into a mechanical impedance Z illustrated in branch C of FIG. 11*e*.

From the analogous circuit diagram it will be noted that the magnitude of the noise radiated by the tank wall is dependent upon the velocity $\dot{x}$ flowing through the radiation impedance $R_A$ of the portion $M_T$ of the tank wall between compliant tubes 36 and also upon the velocity $\dot{x}_1'$ flowing through the radiation impedance $R_A'$ of the mass $M_T'$ contiguous the compliant tube. If the compliant tubes 36 are spaced close enough together, the velocity $\dot{x}$ will not be appreciably different than $\dot{x}_1'$ because these velocities are closely coupled through the relatively high stiffness of the tank wall. In general, minimum radiated noise is obtained when the average velocity of the tank wall is a minimum. Since the impedance path in branch B of FIG. 11*e* including the series arrangement of $M_T'$, $S_T'$, and $R_A'$ is in parallel with the impedance path including the series arrangements of $s_t'$ and $r_t'$, and further since $\dot{x}_1'$ cannot be appreciably different from $\dot{x}$, it is desirable that both the stiffness constant $s_t'$ and the mechanical resistance $r_t'$ of the compliant tubes 36 be reduced in order to decrease the velocity $\dot{x}_1'$ of the tank wall and thus to decrease the amount of noise radiated by the tank wall. It will be noted from the analogous electrical circuit that reduction of $r_t'$ and $s_t'$ will shunt a greater proportion of the vibratory forces tending to excite the tank walls. The lower limit of $s_t'$ is that minimum thickness, material, and shape necessary to result in the required stiffness to support the mass of the liquid dielectric without collapse of the elements. There is no restriction on the minimum desirable $r_t'$. However, some $r_t'$ is necessary in order to meet the minimum required $s_t'$. The manner in which the compliant elements shunt the vibratory forces may be better understood if one considers the core to be analogous to a constant current generator supplying energy to a tank wall load and that the compliant elements function in the manner of a shunt across the constant current generator terminals to reduce the current delivered to the load.

The vibratory forces in the embodiment of FIGS. 1 and 2 are illustrated in FIG. 12 wherein it is represented in FIG. 12*a* that a force generator produces a force F exerted directly against an oil mass $M_o$ associated with a small mass $M_T$ of the tank wall; FIG. 12*c* represents that a force generator produces a force F″ between the magnetic core 19 and the compliant tubes 36 exerted against an oil mass $m_o''$ associated with a small mass $m_t''$ of the compliant tube 36; and FIG. 12*e* represents that a force generator between the compliant tubes 36 and the tank wall produces a force F′ exerted against an oil mass $M_o'$ associated with the small tank wall mass $M_T'$ and also that the reaction force $F_r'$ is exerted against an oil mass $m_o'$, associated with small tube mass $m_t'$. The free body diagrams associated with FIGS. 12*a*, 12*c*, and 12*e* are illustrated in FIGS. 12*b*, 12*d*, and 12*f* respectively, and in order to shorten the description these diagrams will not be discussed. From the free body diagram of FIG. 12*b* it is possible to derive the equation $$F-S_Tx-jw(M_o+M_T)\dot{x}-R_A\dot{x}=0$$

from which the analogous circuit diagram shown in branch A of FIG. 12*g* may be drawn. From the free body diagrams of FIG. 12*d* it is possible to derive the equations $$F''-s_t''(x''-x_1'')-r_t''(\dot{x}''-\dot{x}_1'')-jw(m_o''+m_t'')\dot{x}''=0$$

and $$s_t''(x''-x_1'')+r_t''(\dot{x}''-\dot{x}_1'')-S_T''x_1''-R_A''\dot{x}_1''-jw(M_T''+M_o'')\dot{x}_1''=0$$

from which the analogous electrical circuit diagram shown in branch B of FIG. 12*g* may be drawn. From the free body diagrams of FIG. 12*e* it is possible to derive the equations $$F_r'-jw(m_t'+m_{o1}')\dot{x}'-r_t'(\dot{x}'-\dot{x}_1')-s_t'(x'-x_1')=0$$

and $$s_t'(x'-x_1')+r_t'(\dot{x}'-\dot{x}_1')-jw(m_{o_2}'+Z_1')\dot{x}_1'=0$$

and $$F'-S_T'x_2'-R_A'\dot{x}_2'-jw(M_o'+M_T')\dot{x}_2'=0$$

from which the analogous electrical circuit diagram of branch C of FIG. 12*g* may be drawn.

It will be particularly noted that before a force F′ can be applied directly against the tank wall mass $M_T'$ in the embodiment of FIG. 12*e*, a force $F_r'$ of equal magnitude must be applied in the opposite direction, and that such force F′ exerted against the tank wall can be reduced by shunting the reaction force $F_r'$ with a compliant element that resonates with the oil mass $m_o'$ at the force generator frequency. Resonance of compliant tubes 36 will occur when velocity $\dot{x}'$ is a maximum, and it will be apparent from the analogous circuit diagram that for high values of $Z_1'$, $\dot{x}'$ will be a maximum when the stiffness constant $s_t'$ of the compliant tubes 36 is selected to provide series resonance in the series circuit through which $\dot{x}'$ flows. If the compliant tubes are spaced sufficiently close together, the velocity $\dot{x}$ will not be appreciably greater than the velocities $\dot{x}_1''$ and $\dot{x}_2'$. In general, minimum radiated noise is obtained when the average velocity of the tank wall is a minimum, and since the impedance path in branch B of FIG. 12*g* including the series arrangement of $M_{o_1}''$, $M_T''$, $S_T''$, and $R_A''$ is in parallel with the impedance path including the series arrangement of $s_t''$ and $r_t''$, it is desirable that both the mechanical resistance and stiffness constant of the compliant elements be reduced in order to decrease the velocity $\dot{x}_1''$, and thus reduce the average velocity and the magnitude of the noise radiated by the tank wall.

The embodiments having resonant compliant elements have been found to be particularly effective in varying the compressibility of the liquid dielectric and in shunting the vibratory forces acting on the tank walls. Resonance can be obtained with either metallic or non-metallic compliant elements by selecting the stiffness constant so that the mechanical stiffness reactance and the mechanical inertial reactance due to the mass of the oil and the mass of the compliant element provide series resonance at the frequency of the force generator. The mechanical resistance $r_m$ is held to a minimum in order to maintain a high quality factor Q. In the resonant embodiments employing thin-walled tubes, for example, in the embodiment illustrated in FIGS. 1 and 2, the tubes 36*a* and 36*b* are preferably parallel and line the tank wall in planes in the path of the incident vibratory forces originating in the core. The compliant tubes 36*a* and 36*b* oscillate and re-radiate, and, in addition, are forced to pulsate uniformly in the presence of progressive waves originating in the core 19.

It will be appreciated that in the embodiments of the invention wherein the compliant tubes 36 are filled with material 38 having a high acoustic absorption coefficient, the material 38 abutting the thin tube walls will vary the stiffness constant of the tubes, and consequently the mechanical resistance and the stiffness constant of such compliant tubes 36 so filled with energy absorbing material 38 are selected to shunt a substantial portion of the vibratory forces at the frequency of the wave energy originating in the magnetic core.

In the embodiment of the invention illustrated in FIG. 13, enclosures 50 supported on the inner surfaces of the tank sidewalls 12 and endwalls 13 are provided with thin, perforated, compliant walls 51 facing the core 19 and in the path of the vibratory forces in the liquid dielectric 15 emanating from the core 19. The perforations 52 in wall 51 are covered with a thin sheet 54 of a tough, flexible, oil and temperature resistant material such as polyvinyl chloride which seals enclosure 50 against entry of the liquid dielectric 15. The enclosures 50 are preferably filled with a suitable material 55 such as foam polyurethane or low density fiber glass abutting the sheet 54 and having a high acoustic absorption coefficient. Losses occur in the vibratory forces within enclosures 50 due to (1) scattering, (2) resistive damping, and (3) elastic hysteresis of the material 55. The mechanical stiffness reactance and the mechanical resistance of the perforated wall 51 which functions as the compliant element is of a value which will result in shunting of a considerable portion of the vibratory forces in the liquid dielectric 15 acting on the tank walls.

Figure 8:
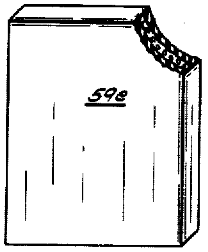

In the embodiment of FIG. 14 compliant elements 59*a* and 59*b* for shunting the vibratory forces transmitted by the oil 15 and tending to excite the tank walls are provided by thin edge-clamped diaphragms 60 of suitable material such as steel or polyvinyl chloride positioned at the corners of the tank 10 beneath the oil 15 and secured in fluid-tight relation to the inner surface of tank sidewalls to form hermetically sealed containers at the tank corners. The enclosure defined by compliant element 59*a* is filled with air and the enclosure defined by compliant element 59*b* is illustrated as filled with a suitable material, such as foam polyurethane, having a high acoustic absorption coefficient. The embodiment of FIG. 14 also includes a compliant element 59*c* analogous to a panel or a diaphragm formed by a member 62 of U-shaped cross section secured at its edges to one tank sidewall 12 to form an enclosure having a flexible wall generally parallel to the tank sidewall 12 and in the path of the incident vibratory forces originating in the core 19. The member 62 may be of a suitable, tough, oil and temperature resistant material such as steel, aluminum, or polyvinyl chloride and the enclosure defined by the compliant element 59*c* may be filled with air or a suitable material such as foam polyurethane. Another compliant element 59*d* analogous to a panel or diaphragm includes a hollow, closed, thin-walled, member 65 mounted by brackets 66 away from the other tank sidewall 12. The member 65 may be formed of a material similar to that of member 62 and may also be filled with air or a suitable material such as foam polyurethane. FIG. 8 illustrates a compliant element 59*e* in the form of a pack of any desired dimensions constructed of a suitable high-temperature-oil resistant material and filled with a material such as polyurethane foam having a high acoustic absorption coefficient and adapted to be disposed between the core 19 and the tank walls to shunt a portion of the vibratory forces transmitted by the oil. The compliant elements 59*a*, 59*b*, 59*c*, 59*d*, and 59*e* have one wall of relatively large area in the path of the incident vibratory forces originating in the core 19 and which may be either resonant or non-resonant at the frequency of the vibratory forces originating in the core 19. The mechanical resistance and the mechanical stiffness reactance of the compliant element 59*a* backed by air, as well as the mechanical resistance and the mechanical stiffness reactance of the compliant elements 59*b*, 59*c*, 59*d*, and 59*e* abutting the high sound absorption coefficient material, are selected so that a substantial portion of the vibratory forces originating in the core and tending to excite the tank wall is shunted.

While only a few embodiments of the invention have been illustrated and described, many modifications and variations thereof will be apparent to those skilled in the art, and consequently it is intended in the appended claims to cover all such modifications and variations as fall within the true spirit and scope of the invention.

We claim:

1. In an electrical transformer having a tank, liquid dielectric within said tank, a gas cushion within said tank above said liquid dielectric, a magnetic core immersed in said dielectric, an electrical winding immersed in said dielectric and linked with said core, means for resiliently supporting said core and for mechanically decoupling said core from said tank, and means including at least one hollow compliant element open at least on one end and immersed in said dielectric between said core and the walls of said tank for increasing the effective compressibility of said liquid dielectric, said hollow compliant element containing gas and being surrounded by said liquid dielectric and having said open end and the interior of said hollow element in communication with said gas cushion, the mechanical resistance and the stiffness constant of said compliant element being such as to tune said compliant element for resonance at the frequency of the vibratory forces originating in said core and to result in said compliant element shunting a portion of the vibratory forces originating in said core and transmitted by said liquid dielectric tending to drive the bottom and side walls of said tank.

2. In an electrical transformer comprising a tank, an insulating dielectric liquid within said tank, a transformer core and coil assembly immersed in said dielectric within said tank and including a magnetic core and an electrical winding linking said magnetic core, means for resiliently supporting said core and for mechanically decoupling said core from said tank, and means including a plurality of elongated, thin-walled, hollow compliant tubes containing gas and each having a straight portion of a length many times greater than the diameter thereof disposed in said liquid dielectric between said core and the walls of said tank for increasing the effective compressibility of said liquid dielectric, whereby the vibratory and sound wave forces originating in said core and transmitted by said liquid dielectric to said tank walls are reduced, said compliant tubes being spaced apart sufficiently so that said dielectric liquid may freely flow directly from said core and coil assembly to the tank walls.

3. In an electrical transformer comprising a tank, an insulating dielectric liquid within said tank, a transformer core and coil assembly immersed in said dielectric within said tank and including a magnetic core and an electrical winding linking said magnetic core, means for resiliently supporting said core and for mechanically decoupling said core from said tank, and means including a plurality of hollow, thin-walled, compliant tubes filled with gas and disposed in parallel relation in said dielectric liquid between said core and said tank walls for increasing the effective compressibility of said liquid dielectric, the elastic stiffness reactance and the mechanical resistance of said tubes being such as to effect the shunting by said tubes of a material portion of the vibratory and sound wave forces originating in said core transmitted by said dielectric liquid and tending to actuate the walls of said tank, said parallel compliant tubes being spaced apart sufficiently so that said dielectric liquid may freely flow directly from said core and coil assembly to the tank walls.

4. In an electrical transformer in accordance with claim 3, wherein said tubes are of polyvinyl chloride.

5. In an electrical transformer in accordance with claim 3, wherein the interior of said hollow tubes contain a material having a high sound absorption coefficient.

6. In an electrical transformer in accordance with claim 3, wherein the interior of said hollow tubes contains a material having high elastic hysteresis.

7. In an electrical transformer comprising a tank, an insulating dielectric liquid within said tank, a transformer core and coil assembly immersed in said dielectric within said tank and including a magnetic core and an electrical winding linking said core, means for resiliently supporting said core and for mechanically decoupling said core from said tank, and means including a plurality of elongated, hollow, thin-walled tubes filled with gas and disposed in said liquid dielectric between said core and said tank walls for increasing the effective compressibility of said liquid dielectric, the mechanical resistance and the stiffness constant of said tubes being such as to result in a pulsating mode of vibration of said tubes in the presence of the vibratory forces originating in said core and transmitted by said dielectric, said tubes being spaced apart sufficiently so that said dielectric fluid may freely flow directly from said core and coil assembly to the tank walls.

8. In an electrical transformer comprising a tank having a bottom wall and vertical sidewalls, an insulating dielectric liquid partially filling said tank, a gas filling said tank above said dielectric liquid, a transformer core and coil assembly immersed in said dielectric within said tank and including a magnetic core spaced from said bottom wall and said sidewalls and an electrical winding linking said core, means for resiliently supporting said core and mechanically decoupling it from said tank, and means including a plurality of hollow, compliant, elongated, thin-walled tubes immersed in said liquid between said core and said tank walls, at least one end of each of said tubes being open and in communication with said gas above said liquid and the portions of said tubes immersed in said liquid dielectric being sealed, the stiffness constant and the mechanical resistance of said tubes being such as to result in said tubes shunting a material portion of vibratory and sound wave forces originating in said core transmitted through said liquid dielectric and acting on said tank walls.

9. In an electrical transformer, a casing, an insulating dielectric liquid within said casing, a transformer core and coil assembly immersed in said dielectric within said casing and including a magnetic core and an electrical winding linking said core, means for resiliently supporting said core and for mechanically decoupling said core from said casing, and means including a plurality of hollow, thin-walled, compliant tubes containing gas immersed in said dielectric liquid between said core and at least one wall of said casing and supported in parallel relation away from said one wall for shunting at least a portion of the vibratory forces originating in said core and transmitted by said dielectric liquid to the walls of said casing, the stiffness constant of said tubes being such as to tune said tubes for resonance at the frequency of said vibratory forces originating in said core, said compliant tubes being spaced apart sufficiently so that said liquid may freely flow directly from said core and coil assembly to the walls of said casing.

10. In an electrical transformer comprising a tank having a bottom wall and vertical sidewalls, an insulating dielectric liquid within said tank, a transformer core and coil assembly immersed in said dielectric within said tank and including a magnetic core spaced from said bottom wall and said sidewalls and an electrical winding linking said magnetic core, means for resiliently supporting said core and for mechanically decoupling said core from said tank, and means including a thin apertured compliant wall in the path of the vibratory forces originating in said core transmitted through said dielectric and supported from the inner surface of one of the tank walls beneath said liquid dielectric for increasing the effective compressibility of said liquid dielectric, said last-named means also including a thin sheet of compliant material sealing the apertures in said wall and material having a high acoustic absorption coefficient abutting against said sheet.

11. In an electrical transformer comprising a tank having a bottom wall and vertical sidewalls, an insulating dielectric liquid within said tank, a transformer core and coil assembly immersed in said dielectric within said tank and including a magnetic core spaced from said bottom wall and said sidewalls and an electrical winding linking said magnetic core, means for resiliently supporting said core and for mechanically decoupling said core from said tank, means including a plurality of spaced apart, elongated, hollow, thin-walled, compliant tubes of noncircular cross section filled with gas immersed in said liquid dielectric and having straight parallel portions supported in spaced relation to at least one of the tank walls for shunting a portion of the vibratory forces originating in said core and transmitted through said dielectric tending to actuate the tank walls, said tubes being in the path of the vibratory forces transmitted by said dielectric and the stiffness constant $s_t$ of said compliant tubes being such as to tune said tubes for resonance at the frequency of said vibratory forces, said compliant tubes being spaced apart sufficiently so that said liquid may freely flow directly from said core and coil assembly to the tank walls.

12. In an electrical transformer comprising a tank having a bottom wall and vertical sidewalls and endwalls, an insulating dielectric liquid partially filling said tank, a gaseous medium filling said tank above said liquid dielectric, a transformer core and coil assembly immersed in said liquid dielectric within said tank and including a magnetic core and an electrical winding linking said magnetic core, means for resiliently supporting said core and for mechanically decoupling said core from said tank, a plurality of elongated, hollow, thin-walled, spaced apart, compliant tubes of U-shape immersed in said dielectric liquid and lining the bottom wall and the sidewalls of said tank, and a plurality of elongated, hollow, thin-walled, spaced apart, straight, vertical, compliant tubes sealed at their lower ends immersed in said liquid dielectric and lining said endwalls of said tank, the upper ends of said compliant tubes being open and in communication with said gaseous medium, the elastic stiffness reactance and the mechanical resistance of said compliant tubes being of a magnitude which will effect the shunting of a material portion of the vibratory and sound wave forces originating in said core and transmitted by said liquid dielectric and exerted against said tank wall.

13. In an electrical transformer comprising a tank having a bottom wall and vertical sidewalls, an insulating dielectric liquid within said tank, a transformer core and coil assembly immersed in said dielectric within said tank and including a magnetic core and an electrical winding linking said core, means for resiliently supporting core and for mechanically decoupling it from said tank, and means including a plurality of hollow, compliant, thin-walled tubes immersed in said liquid dielectric between said core and the tank walls for shunting at least a portion of the vibratory forces originating in said core and transmitted through said liquid dielectric tending to actuate said tank walls, the portions of said tubes immersed in said liquid being sealed and the upper ends of said tubes being open and in communication with a gaseous medium.

14. In an electrical transformer in accordance with claim 13 wherein said gaseous medium is external of said tank and said tubes in communication with said gaseous medium extend through the walls of said tank.

15. In an electrical transformer, in combination, a tank, liquid dielectric within said tank, a magnetic core immersed in said liquid dielectric within said tank, an electrical winding linking said magnetic core, means for resiliently supporting said core and for mechanically decoupling it from said tank, and means including a plurality of spaced apart, elongated, hollow, thin-walled, compliant tubes filled with gas supported in parallel relation in said liquid against at least one of the walls of said tank for shunting a portion of the vibratory forces originating in said core transmitted through said liquid and tending to vibrate the walls of said tank, said tubes being in the path of said vibratory forces and each said tube having a minimum stiffness constant $s_t$ and a low mechanical resistance $r_t$, said compliant tubes being spaced apart sufficiently so that said liquid dielectric may freely flow directly from said core to the tank walls.

16. In an electrical transformer in accordance with claim 15 wherein said tubes are of polyvinyl chloride filled with polyurethane foam.

17. In combination, a casing, liquid within said casing, a force generator immersed in said liquid within said casing, means for resiliently supporting said generator and for mechanically decoupling it from said casing, and means including a plurality of spaced apart, elongated, hollow, thin-walled, compliant tubes containing gas disposed in said liquid in spaced relation to at least one of the walls of said casing for shunting at least a portion of the vibratory forces originating in said generator and transmitted through said liquid tending to actuate the walls of said casing, said tubes being in the path of said vibratory forces and the stiffness constant $s_t$ of said tubes being resonant with the mass of oil $m_o$ and the tube mass $m_t$ associated therewith and tuning said tubes to resonance at the frequency of the vibratory forces originating in said generator, said compliant tubes being spaced apart sufficiently so that said liquid may freely flow directly from said generator to the walls of said casing.

References Cited in the file of this patent

UNITED STATES PATENTS 1,846,887 Matthews ------------- Feb. 23, 1932
2,050,888 Kirch ---------------- Aug. 11, 1936
2,731,606 Stewart --------------- Jan. 17, 1956
2,870,858 Adams --------------- Jan. 27, 1959

FOREIGN PATENTS 913,294 France --------------- May 27, 1946

UNITED STATES PATENT OFFICE
CERTIFICATE OF CORRECTION

Patent No. 3,102,246

August 27, 1963

Charles C. Honey et al.

It is hereby certified that error appears in the above numbered patent requiring correction and that the said Letters Patent should read as corrected below.

Column 13, line 11, before "core" insert -- said --.

Signed and sealed this 7th day of April 1964.

SEAL)
.ttest:

RNEST W. SWIDER
.ttesting Officer

EDWARD J. BRENNER

Commissioner of Patents